Oct. 26, 1943.  F. G. BOUCHER  2,332,777
ORIENTING DEVICE
Filed Jan. 25, 1943

Frank G. Boucher, INVENTOR.

BY J. D. McKean

ATTORNEY.

Patented Oct. 26, 1943

2,332,777

UNITED STATES PATENT OFFICE 2,332,777

ORIENTING DEVICE

Frank G. Boucher, Tulsa, Okla., assignor to Standard Oil Development Company, a corporation of Delaware Application January 25, 1943, Serial No. 473,513

4 Claims. (Cl. 33—205.5)

The present invention is directed to an orienting device particularly suitable for bore hole operations.

When conducting operations in bore holes or at other places inaccessible to the operator, it is frequently desirable to determine the orientation of a tool or device. Orienting devices are at present known to the art, but they are in general unsatisfactory, either because they are incapable of giving a continuous record, or in being unduly complicated.

It is an object of the present invention to produce an improved orienting device.

More particularly, it is an object of the present invention to devise a cable-suspended tool which will give to an operator at the surface a continuous indication of the orientation of the tool in a bore hole.

Other objects and advantages of the present invention may be seen from reading the following description, taken with the drawing, in which Fig. 1 is an elevation partly in section of one embodiment of the present invention.

Figure 1:
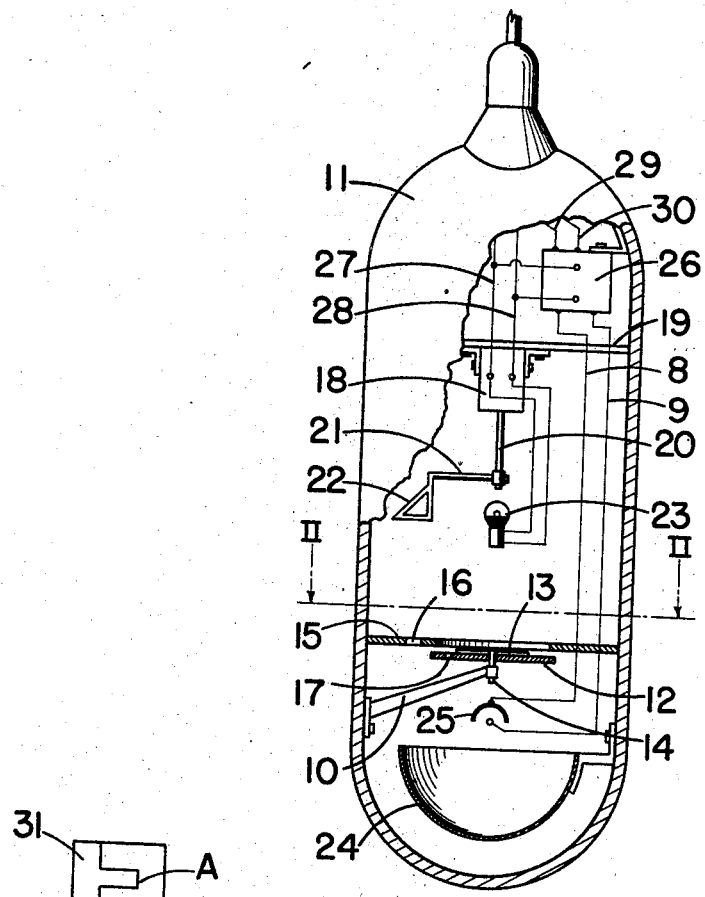

Referring now specifically to the drawing, a shell or case 11, of a non-magnetic material such as brass, has mounted therein circular member 12, to which is attached bar magnet 13. A pivot 14 extends through member 12 and is supported by a suitable bracket 10. An annulus 15 has its periphery secured to case 11 and is arranged so that the circle defined by its inner circumference is slightly above and inside of the periphery of member 12. Member 15 is provided with opening 16 and member 12 is provided with a similar but smaller opening 17. It will be apparent that the arrangement just described is generally similar to a marine compass, with opening 16 corresponding to the lubber's line on such a compass, and opening 17 corresponding to the north point of the compass.

Some distance above member 12 a motor 18 is secured to bracket 19, with shaft 20 of the motor lying on an extension of pivot 14 of member 12. A laterally-extending member 21 is secured to shaft 20, and carried thereby is prism 22. A source of light 23 is stationarily arranged adjacent prism 22, so that with each rotation of the prism a light from source 22 will be transmitted through openings 16 and 17.

Below members 12 and 15 is fixed a suitably curved mirror 24. This mirror serves to reflect light transmitted through openings 16 and 17 to a centrally arranged light sensitive device 25. As a suitable light sensitive device a photoelectric cell 25 may be employed and is diagrammatically illustrated in the drawing, with the cell feeding to amplifier 26 by means of conductors 8 and 9.

Electrical conductors 27 and 28 are arranged for supplying power to amplifier 26, motor 18, and source of light 23. In addition the signal from amplifier 26 may be transmitted to the surface through conductors 29 and 30. It will be understood that conductors 29 and 30 may be connected to a conventional recording galvanometer arranged at the surface of the earth. These recording galvanometers are conventional to the art, and accordingly it is unnecessary to illustrate such a device in drawing. A suitable record obtained by the employment of the device of the present invention as recorded by the galvanometer is illustrated in Fig. 3.

In determining the orientation of case 11, the device may be lowered at the end of a cable, with power being supplied by constant speed motor 18, which in turn rotates prism 22 at a constant rate. Every time prism 22 passes above opening 16 a ray of light will be passed through this opening and be reflected to light-sensitive means 25. In like manner the passage of prism 22 above opening 17 will cause a ray of light to be momentarily transmitted to the light-sensitive source 25. When openings 16 and 17 lie on a common radius, the light from source 23 will be transmitted through openings 16 and 17 simultaneously, but any angular movement of member 12, with respect to casing 11, will cause a separation of openings 16 and 17, with a resulting interval between the time the light passes through opening 16 and through opening 17. In other words, if the openings 16 and 17 are arranged so that the light will pass through the two openings simultaneously when magnet 13 points to the magnetic north, any deviation of the case 11 from this orientation will be indicated by the angular separation of openings 16 and 17.

Figure 3:
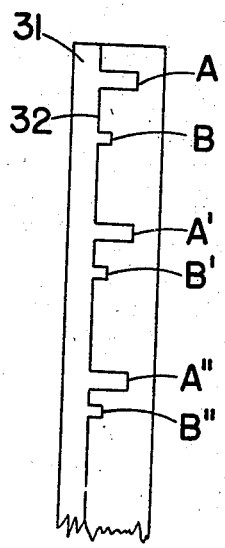
Fig. 3 is a view of a typical record which may be obtained by the device shown.
Figure 2:
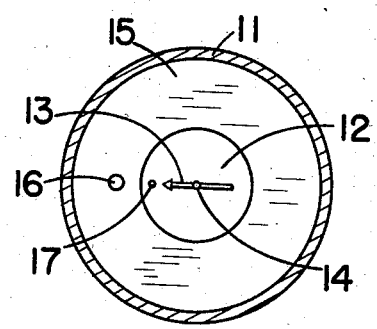
Fig. 2 is a view taken along the line II—II of Fig. 1.

The portion of the record shown in Fig. 3 illustrates the operation of the device. The strip of film carrying the record is designated by numeral 31, with the record produced by the galvanometer being designated by numeral 32. The passage of light through opening 16 is indicated on the record by the kicks A, A', and A''. In like manner the passage of light through opening 17 is illustrated on the record by kicks B, B', and B''. It will be seen that the larger opening 16 allows a passage of a greater amount of light than the smaller opening 17, so that the kicks produced by the passage of light through the two openings may be distinguished readily. It will be evident in the portion of the records shown in Fig. 3 that opening 17 is progressively approaching opening 16. This is indicated by the fact that the points A'' and B'' are spaced closer together than points A' and B', which in turn are closer than points A and B.

It will be evident that the device of the present invention may be employed in a number of different circumstances. For example, it may be used with an inclinometer to give a continuous orientation of the inclinometer. As another example, it may be used in the orientation of whipstalks and directional drilling.

While I have disclosed a specific embodiment of the present invention, it will be apparent that various changes may be made without departing from the scope of the invention. For example, while I have disclosed a stationary light source and a revolving prism, the device may be modified by dispensing with the prism and giving the light source a rotary movement. In like manner, the position of the members may be reversed by putting the light-sensitive device 25 in the upper portion of the casing 11 and the source of light below members 12 and 15.

I claim:

1. A device for indicating orientation, comprising in combination a source of light arranged for periodic movement, a light-sensitive device longitudinally spaced from said light source, a partition provided with an orifice, a second partition provided with an opening, and freely moveable with respect to said first partition, said partitions separating said light source from said light-sensitive means.

2. A bore hole orienting device, comprising in combination a container arranged to be suspended by a cable, a source of light arranged in said container for periodic lateral movement, an annular-shaped partition secured to said container and provided with an opening for momentarily transmitting light each period of said light source; a second partition arranged within said container, freely moveable for remaining in a predetermined direction, and provided with an orifice for momentarily transmitting light from said light source with each revolution of said light source, and a light-sensitive means separated from said light source by said two partitions, whereby it receives an increased intensity of light at spaced intervals.

3. A bore hole orienting device comprising in combination a container adapted to be suspended by a cable, a source of light, an annular-shaped partition secured to said container and provided with a relatively small opening, a second partition provided with an opening pivoted within said container for rotation therein with the plane of said partition at right angles to the longitudinal axis of the container, means arranged to orient said second partition in accordance wtih the magnetic lines of force adjacent said container, means arranged to project light from said light source on said partitions and give said light periodic motion whereby light rays momentarily pass through the openings in said partitions each period, and a light sensitive means arranged to receive the light passing through the orifices of said partitions.

4. A bore hole orienting device comprising in combination a container, a cable arranged to support said container, a source of light arranged in the said container on the longitudinal axis thereof, a prism laterally spaced from said source of light to project light received from said source in a longitudinally extending beam, means arranged to rotate said prism at a uniform rate around the longitudinal axis of said container, an annular-shaped partition provided with a relatively small opening secured to said container at a spaced interval from said prism whereby the light projected from said prism will momentarily be transmitted through said opening with every revolution of said prism, a circular partition arranged in said container adjacent said annular partition and provided with a relatively small opening adjacent its periphery, a means arranged to orient said circular partition in accordance with the lines of magnetic force adjacent said container, a light sensitive means arranged to receive the light passing through the openings in said partition, and an amplifier for said light sensitive means electrically connected thereto.

FRANK G. BOUCHER.